United States Patent
Park et al.

(10) Patent No.: US 8,823,887 B2
(45) Date of Patent: Sep. 2, 2014

(54) MOBILE TERMINAL AND METHOD FOR PRODUCING DISPLAY MODULE OF MOBILE TERMINAL

(75) Inventors: Jongseok Park, Gyeonggi-Do (KR); Youngtae Im, Gyeonggi-Do (KR); Kwonjin Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/150,841

(22) Filed: Jun. 1, 2011

(65) Prior Publication Data

US 2011/0312388 A1 Dec. 22, 2011

(30) Foreign Application Priority Data

Jun. 21, 2010 (KR) .................. 10-2010-0058741

(51) Int. Cl.
*G02F 1/1335* (2006.01)

(52) U.S. Cl.
USPC ............................................ 349/12; 345/173

(58) Field of Classification Search
CPC ............... G02F 1/13338; G02F 2001/13312; G06F 3/0412; G06F 3/044; G06F 3/045
USPC .................................. 349/12; 345/173–178
See application file for complete search history.

(56) References Cited

U.S. PATENT DOCUMENTS

| | | | | |
|---|---|---|---|---|
| 6,472,581 B1 * | 10/2002 | Muramatsu et al. | ............ | 602/41 |
| 2002/0154254 A1 * | 10/2002 | Tasaki et al. | .................... | 349/58 |
| 2004/0263481 A1 * | 12/2004 | Nishikawa et al. | ........... | 345/173 |

FOREIGN PATENT DOCUMENTS

JP H06-337411 * 12/1994

* cited by examiner

*Primary Examiner* — Bumsuk Won
*Assistant Examiner* — Ryan Crockett
(74) *Attorney, Agent, or Firm* — Birch, Stewart, Kolasch & Birch, LLP

(57) ABSTRACT

A mobile terminal and a method of manufacturing a display module provided therein are provided. The mobile terminal may include a main body, a display located at the main body, a window located at the main body to cover the display, a touch sensor located at a surface of the window to detect a touch input, a gel sheet adhered to one of the touch sensor and the display, the gel sheet being made of a light-transmittance material to fill a space between the touch sensor and the display, and an air exhaust agent disposed between the gel sheet and the other one of the touch sensor and the display to displace air. The air exhaust agent changes from a liquid phase to a gel state over time.

9 Claims, 8 Drawing Sheets

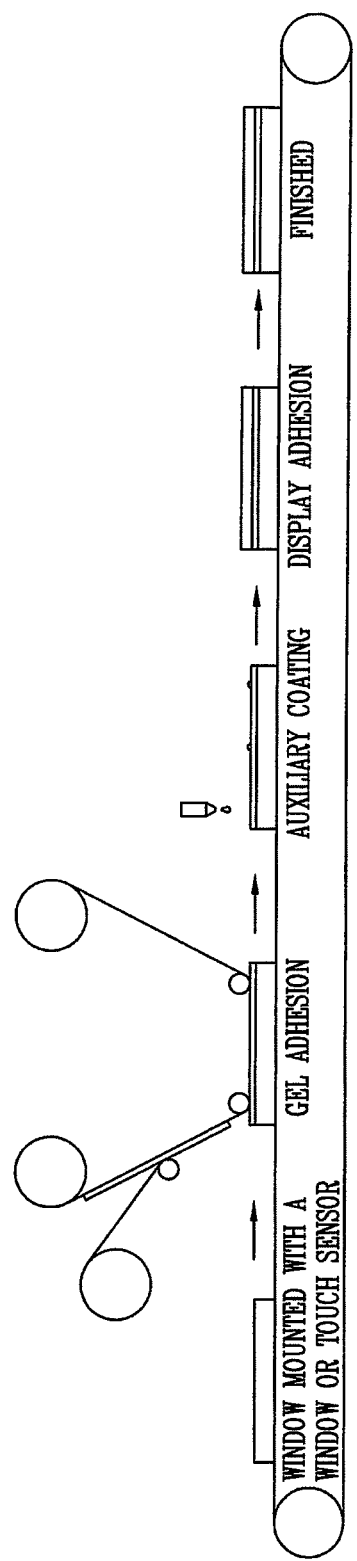

MOBILE TERMINAL AND METHOD FOR PRODUCING DISPLAY MODULE OF MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0058741, filed on Jun. 21, 2010, the contents of which is incorporated by reference herein in its entirety.

BACKGROUND OF THE INVENTION

1. Field of the Invention

The present disclosure relates to a mobile terminal having a display module and a method of manufacturing a display module thereof.

2. Description of Related Art

Terminals can be classified into two types including a mobile terminal and a stationary terminal. Furthermore, the mobile terminal can be further classified into two types including a handheld terminal and a vehicle mounted terminal.

Over time, these terminals have become multifunctional, such that they have the ability to capture still images or moving images, play music or video files, play games, receive broadcast and the like. These terminals are often referred to as multimedia players.

In order to implement the complex function of a multimedia player, various attempts have been applied in the aspects of hardware and software implementation. As an example, a user interface environment is provided for the user to easily or conveniently retrieve or select a function.

Furthermore, because a mobile terminal is considered as a personal belonging for expressing one's own personality, various design forms are required. The design forms include structural changes and improvements for the user to more conveniently use the mobile terminal. The performance of a display module may be considered as one of such structural changes and improvements.

BRIEF SUMMARY OF THE INVENTION

The present disclosure is to provide a mobile terminal having a display module with a better optical performance.

The present disclosure relates to a display module and a manufacturing method thereof in which the rework can be done easily when combining a display with a window.

In order to accomplish the foregoing objective, a mobile terminal having a main body, a display located in the main body, a window located at the main body to cover the display, a touch sensor located at a surface of the window to detect a touch input, a gel sheet adhered to one of the touch sensor and the display, the gel sheet being made of a light-transmittance material to fill a space between the touch sensor and the display, and an air exhaust agent disposed between the gel sheet and the other one of the touch sensor and the display to displace air may be provided. The air exhaust agent changes from a liquid phase to a gel state over time.

Alternatively, a mobile terminal having a main body, a display located in the main body, a window located at the main body to cover the display, a gel sheet located at one of the window and the display to fill a space between the window and the display, and an air exhaust agent disposed between the gel sheet and the other one of the window and the display to displace air from the space may be provided. The air exhaust agent changes from a liquid phase to a gel state over time.

A method of manufacturing a display module having a touch sensor and a display is also provided. The method includes laminating a gel sheet made of a light-transmittance material on one of the touch sensor and the display, coating an air exhaust agent on the gel sheet or the other one of the touch sensor and the display, and laminating the touch sensor and the display to each other to press the air exhaust agent. The air exhaust agent changes from a liquid phase to a gel state over time.

Furthermore, a method of manufacturing a display module having a window and a display is provided. The method includes laminating a gel sheet made of a light-transmittance material on one of the window and the display, coating an air exhaust agent on the gel sheet or the other one of the window and the display, and laminating the window and the display to each other to press the air exhaust agent. The air exhaust agent changes from a liquid phase to a gel state over time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 10 is a conceptual view illustrating another example of a method of manufacturing a display module according to the present invention.

DETAILED DESCRIPTION OF THE INVENTION

Hereinafter, a mobile terminal associated with the present invention and a method of manufacturing a display module thereof will be described in more detail with reference to the accompanying drawings. A suffix "module" or "unit" used for constituent elements disclosed in the following description is merely intended for easy description of the specification, and the suffix itself does not give any special meaning or function. A mobile terminal disclosed herein may include a portable phone, a smart phone, a laptop computer, a digital broadcast terminal, a personal digital assistant (PDA), a portable multimedia player (PMP), a navigational device, and the like.

Figure 1:
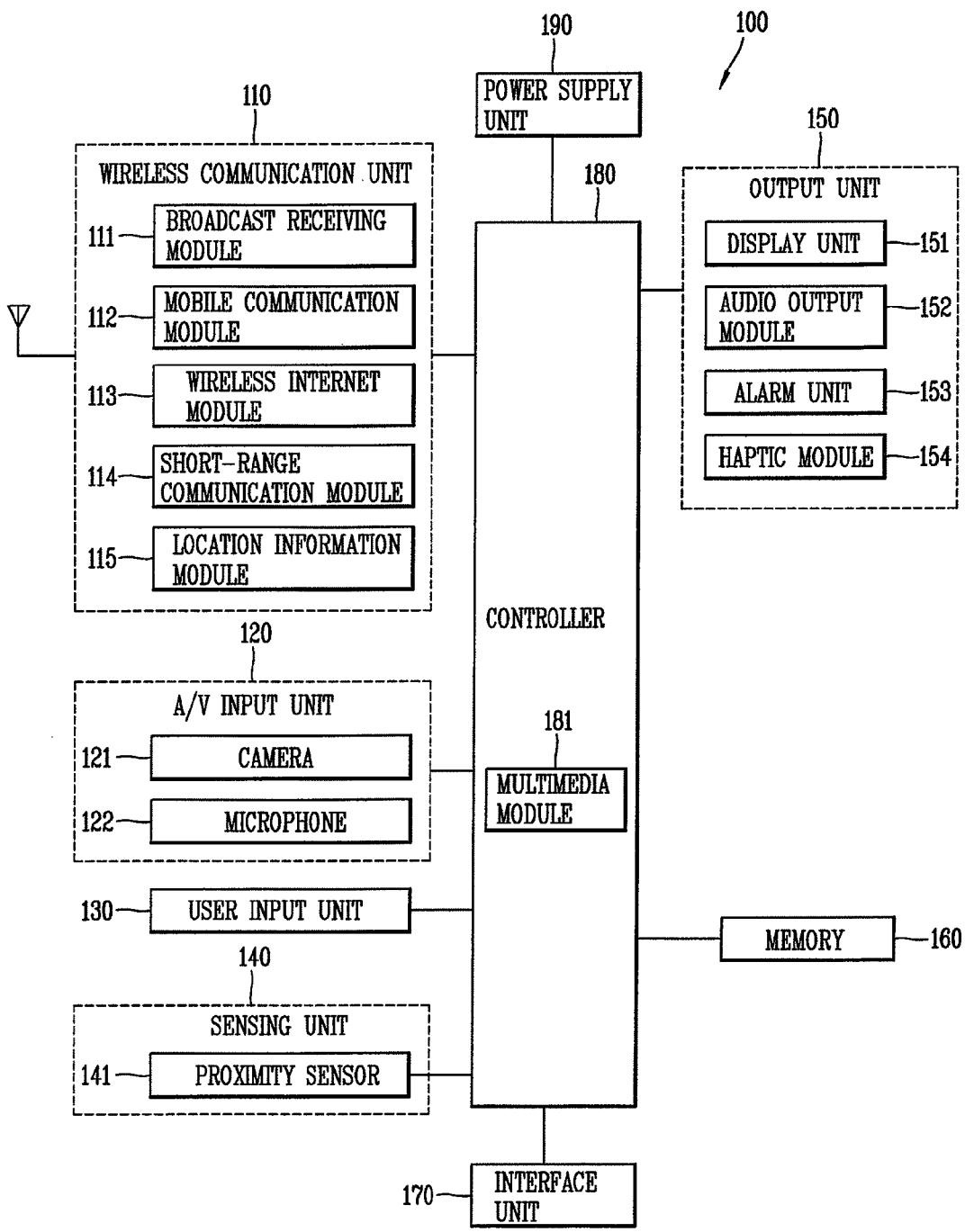
FIG. 1 is a block diagram illustrating a mobile terminal associated with an embodiment of the present invention.

FIG. 1 is a block diagram illustrating a mobile terminal associated with an embodiment of the present invention. The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast signal and/or broadcast-associated information received through the broadcast receiving module 111 may be stored in the memory 160.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces. In embodiments where the display unit 151 and a touch sensitive sensor (referred to as a touch sensor) have an interlayer structure, the structure may be referred to as a touch screen. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include a call received, a message received, a key signal input, a touch input, and the like. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image. The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
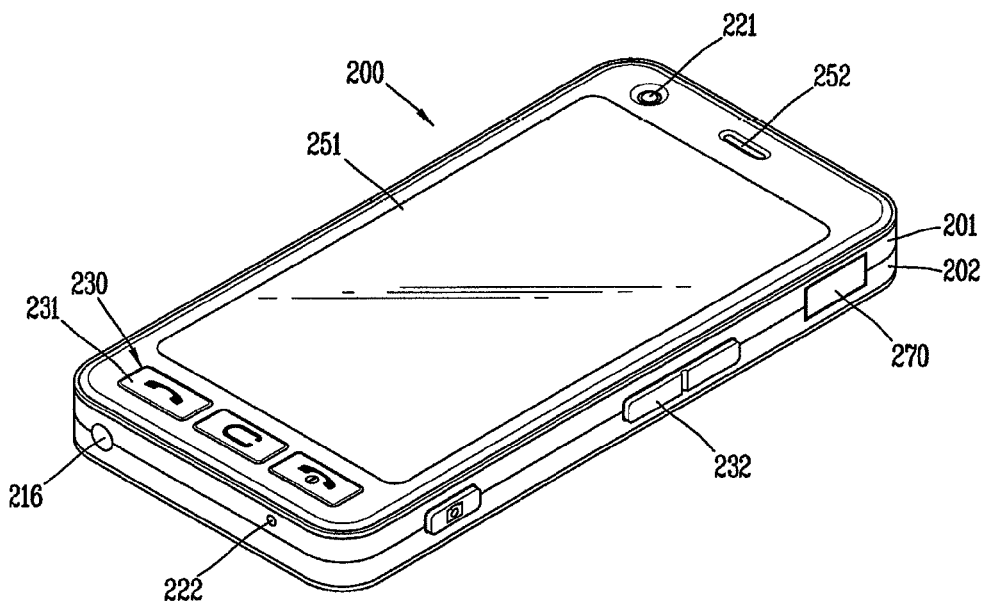
FIG. 2A is a front perspective view illustrating an example of a mobile terminal associated with the present invention.
Figure 2B:
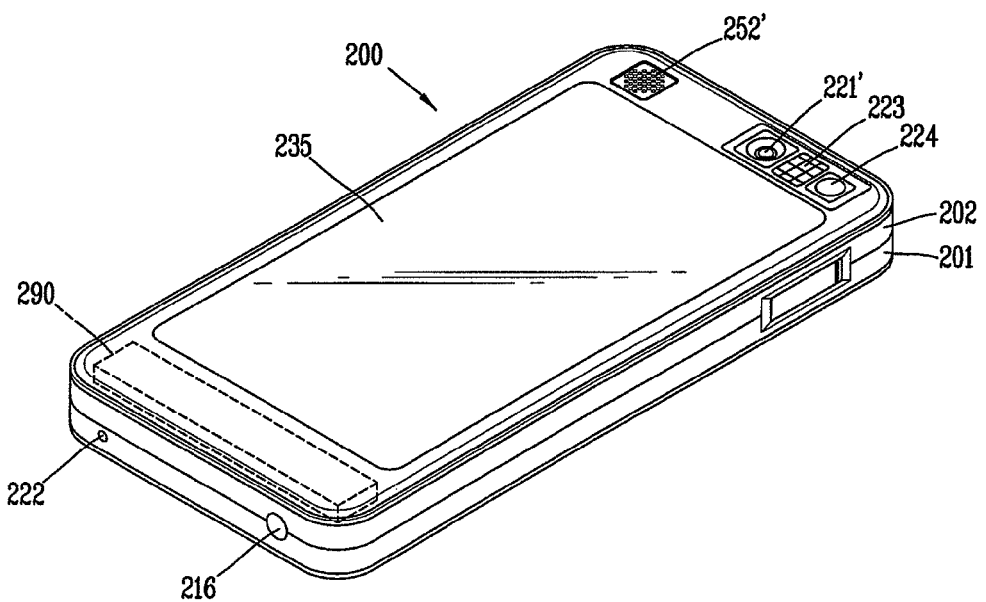
FIG. 2B is a rear perspective view of the mobile terminal of FIG. 2A.

FIG. 2A is a front perspective view illustrating an example of a mobile terminal associated with the present invention, and FIG. 2B is a rear perspective view illustrating a mobile terminal illustrated in FIG. 2A. The main terminal 200 disclosed herein is provided with a bar-type terminal body. However, the present invention is not limited to this type of terminal, but is also applicable to various structures of terminals such as slide type; folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 201 and a rear case 202. At least one intermediate case may be additionally disposed between the front case 201 and the rear case 202. The cases may be formed by injection-molding a synthetic resin or may be also formed of a metal material such as stainless steel (STS), titanium (Ti), or the like.

A display module 251, an audio output module 252, a camera 221, a user input unit 230, a microphone 222, and the like may be arranged on the terminal body, mainly on the front case 201. The display module 251 may occupy a major portion of the front case 201. The audio output unit 252 and the camera 221 are disposed at a region adjacent to one end of the display module 251, and the user input unit 231 and the microphone 222 are disposed at a region adjacent to the other end thereof. The user interface 232 and the interface 270, and the like, may be disposed on a lateral surface of the front case 201 and the rear case 202.

The user input unit 230 is manipulated to receive a command for controlling the operation of the portable terminal 200, and may include a plurality of manipulation units 231, 232. The manipulation units 231, 232 may be commonly designated as a manipulating portion, and any method may be employed if it is implemented in a tactile manner allowing the user to perform manipulation with a tactile feeling.

The content inputted by the manipulation units 231, 232 may be set in various ways. For example, the first manipulation unit 231 may be used to receive a command, such as start, end, scroll, 3D browser execution, or the like, and the second manipulation unit 232 may be used to receive a command, such as controlling a volume level being outputted from the audio output unit 252, or switching it into a touch recognition mode of the display module 251. The display module 251 together with a touch sensor 251c (see FIG. 3) may form a touch screen, and the touch screen may function as a manipulation unit.

Referring to FIG. 2B, a camera 221' may be additionally mounted on a rear surface of the terminal body, namely, the rear case 202. The camera 221' has an image capturing direction, which is substantially opposite to the direction of the camera 221 (refer to FIG. 2A), and may have different pixels from those of the first video input unit 221. For example, it is preferable that the camera 221 has a relatively small number of pixels enough not to cause a difficulty when the user captures his or her own face and sends it to the other party during a video call or the like, and the camera 221' has a relatively large number of pixels since the user often captures a general object that is not sent immediately. The cameras 221, 221' may be provided in the terminal body in a rotatable or pop-out manner.

In addition, a flash 223 and a mirror 224 may be disposed adjacent to the camera 221'. The flash 223 illuminates light toward an object when capturing the object with the camera 221'. The mirror 224 allows the user to look at his or her own face, or the like, in a reflected way when capturing himself or herself (in a self-portrait mode) by using the camera 221'.

An audio output unit 252' may be disposed on a rear surface of the terminal body. The audio output unit 252' together with the audio output unit 252 (refer to FIG. 2A) can implement a stereo function, and it may be also used to implement a speaker phone mode during a phone call.

An antenna 216 for receiving broadcast signals may be additionally disposed on a lateral surface of the terminal body. The antenna 216 constituting a broadcast receiving module 111 (refer to FIG. 1) may be provided so as to be pulled out from the terminal body.

A power supply unit 290 for supplying power to the portable terminal 200 may be mounted on a rear surface of the terminal body. The power supply unit 290 may be configured so as to be incorporated in the terminal body or directly detachable from the outside of the terminal body.

A touch sensor 235 for detecting a touch may be additionally mounted on the rear case 202. The touch sensor 235 may be configured in an optical transmission type similarly to the display module 251. In this case, if the display module 251 is configured to output visual information from both sides of the display module 251, then the visual information may be also recognized through the touch sensor 235. The information being outputted from the both sides thereof may be controlled by the touch sensor 235. Alternatively, a display may be additionally mounted on the touch sensor 235, and a touch screen may be also disposed on the rear case 202.

The touch sensor 235 may be operated in association with the display module 251 of the front case 201. The touch sensor 235 may be disposed in parallel at a rear side of the display module 251. The touch sensor 235 may have a size the same as or less than that of the display module 251.

Referring to FIGS. 2A and 2B, a mechanism for enhancing visibility may be implemented in the display module 251 of the front case 201, or the rear case 202. Hereinafter, the mechanism for enhancing visibility will be described in more detail.

Figure 3:
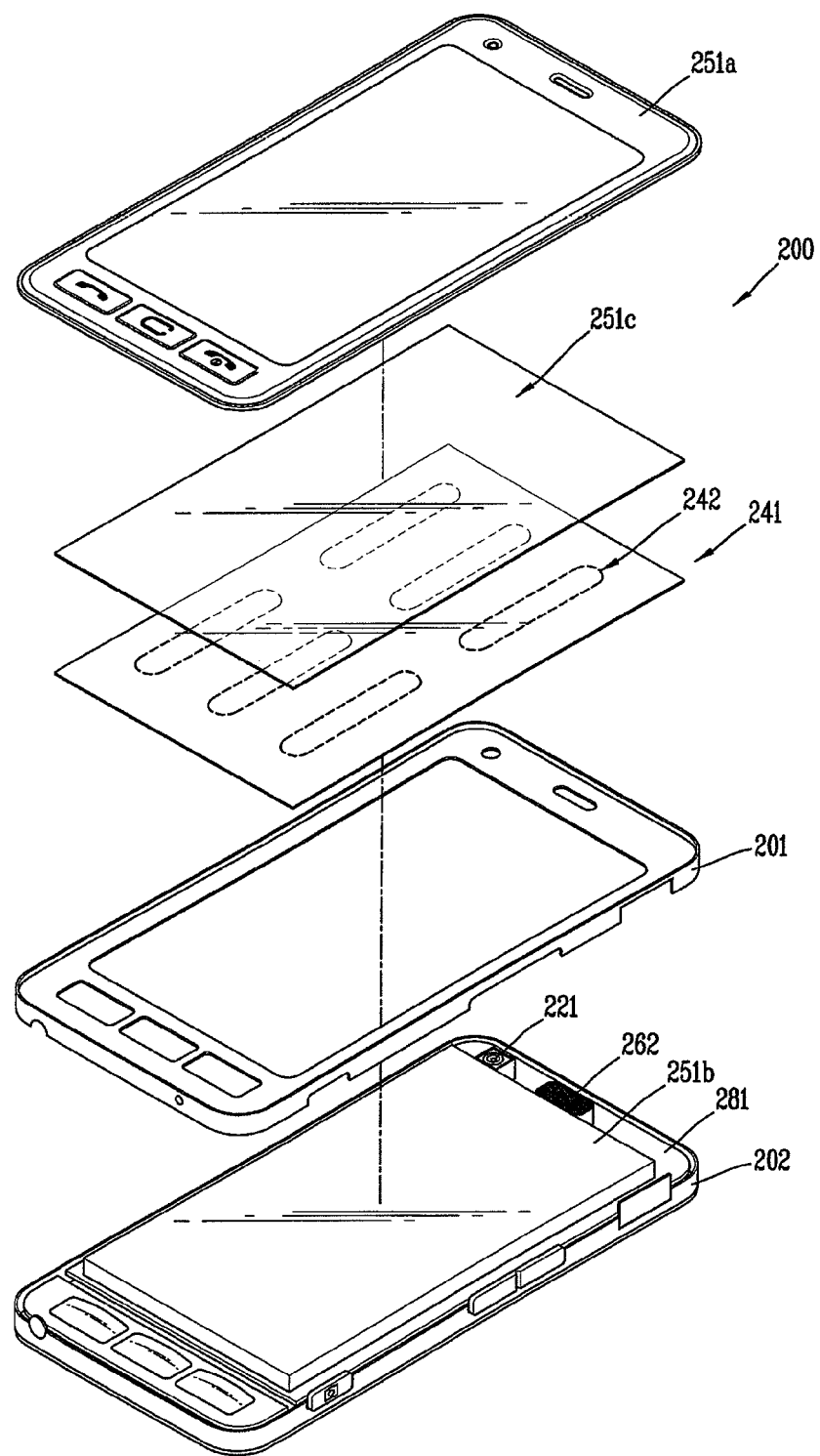
FIG. 3 is an exploded view of the mobile terminal of FIG. 2A.
Figure 4:
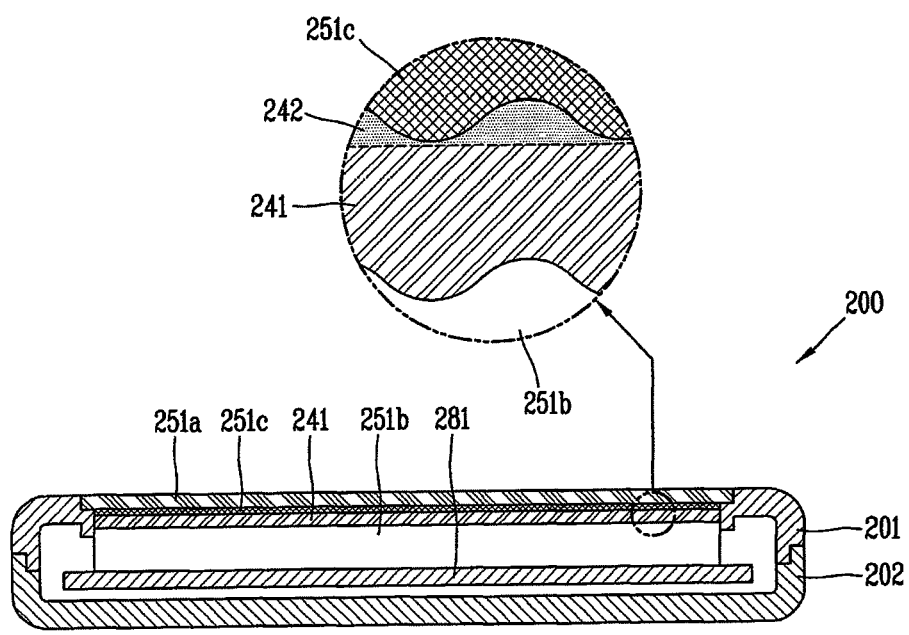
FIG. 4 is a cross-sectional view taken along the line IV-IV in FIG. 2A.

FIG. 3 is an exploded view illustrating the mobile terminal in FIG. 2A, and FIG. 4 is a cross-sectional view taken along the line IV-IV in FIG. 2A. Referring to FIG. 3, a window 251a is combined with a surface of the front case 201. The window 251a is configured with a light transmittable material, for example, light-transmittance plastic, tempered glass, and the like. However, the window 251a may include a portion incapable of transmitting light.

A display 251b may be mounted at a rear surface of the window 251a for displaying visual information in such a manner that the display 251b is covered by the window 251a. The display 251b may be any one of a Liquid Crystal Display (LCD), a Thin Film Transistor-LCD (TFT-LCD), an Organic Light Emitting Diode (OLED) display, a flexible display, and a three-dimensional (3D) display, and the like. At least a portion of the window 251a capable of transmitting light may have an area corresponding to the display 251b. Through this portion of the window 251a the user may recognize visual information displayed on the display 251b from the outside.

A circuit board 281 may be mounted in the rear case 202. The circuit board 281 may be configured as the controller 180 (see FIG. 1) for performing various functions of the mobile terminal. An audio output element 262 corresponding to the audio output unit 252, a camera 221, and the like, may be mounted on the circuit board 281. For example, the audio output element 262 may be a speaker, a receiver, or the like.

A touch sensor 251c may be mounted on the window 251a. The touch sensor 251c may be mounted on a rear surface of the window 251a, and a portion of the window 251a through which light is transmitted may form a region capable of transmitting an input to the touch sensor 251c. The touch sensor 251c made of a light-transmittance material transforms a change in voltage, capacitance, or the like generated at a specific portion of the window 251a into an electrical input signal to detect a touch input.

In this exemplary embodiment, a window 251a, a touch sensor 251c, and a display 251b may be configured as the display module 251 (see FIG. 2A), and the display module 251 will be operated as a touch screen.

Referring to FIGS. 3 and 4, a gel sheet 241 may be adhered to either one of the touch sensor 251c and the display 251b to fill a space between the touch sensor 251c and the display 251b. The gel sheet 241 may be compressed in the space between the touch sensor 251c and display 251b. For example, the gel sheet 241 may be disposed therein by being attached to the touch sensor 251c, and then covered by the display, or vice versa. The gel sheet 241 may be a liquid medium with a high viscosity to become a colloid (a lump of fine particles spread out in a continuous medium) having solid-like properties.

The gel sheet 241 is attached to the touch sensor 251c or display 251b due to the viscosity of its own outermost surface. Since the adhesion using viscosity does not have a strong coherence, the adhered gel sheet 241 may be detached therefrom again. As a result, the touch sensor 251c, the display 251b, and the window 251a can be easily separated for rework if a defect occurs during assembly.

The gel sheet 241 may be formed to provide excellent optical performance (e.g., a light-transmittance material with a high light transmissivity), and may be formed in the form of a thin sheet. For example, the gel sheet 241 may have a refractive index of about 1.475, and a transmissivity of about 92.5%, and a difference of refractive index from that of the window 251a of less than that of the air, thereby enhancing the visibility of the display 251b. As a further example, the gel sheet 241 may have methyl methacrylate as an ingredient, and may be produced by the reaction of styrene and acrylic acid as in the following formula:

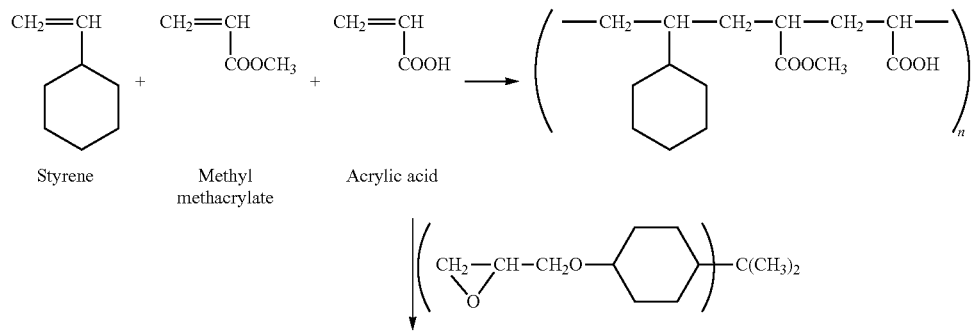

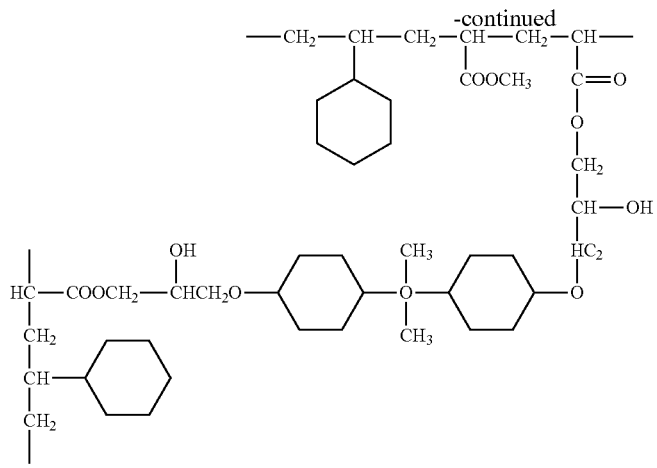
-continued

As shown in FIGS. 3 and 4, an air exhaust agent 242 is disposed between the gel sheet 241 and the other one of the touch sensor 251c and display 251b and is provided to displace air. For example, in this exemplary embodiment, the exhaust agent 242 is disposed between the touch sensor 251c and the gel sheet 241. The exhaust agent 242 may be made to change from a liquid phase to a gel state over time. For example, the material in a gel type may be liquefied so that the exhaust agent 242 can flow. The air exhaust agent 242 may be made of the same material as the gel sheet 241 to be integrated into the gel sheet 241 while being changed into the gel state.

The air exhaust agent 242 may be coated on the gel sheet 241 or a main surface of the touch sensor 251c with a preset pattern to planarize the main surface of the touch sensor 251c. For example, the air exhaust agent 242 is coated on the gel sheet 241 to be pressed by the touch sensor 251c, and covered by the touch sensor 251c or the window 251a mounted with the touch sensor 251c.

Referring to FIG. 4, microscopically, the surface of the touch sensor 251c and display 251b is rough. Since the gel sheet 241 is compressed against the display 251b, air is displaced to the outside while the gel sheet 241 fills into fine grooves of the display 251b. The surface of the gel sheet 241 is covered by the touch sensor 251c, and thus the exhaust agent 242 is pressed and spread out laterally to fill into fine grooves of the touch sensor 251c, and cured into a gel state to be integrated into the gel sheet 241. At this time, a hydrophobic plasticizer having olefin-based oil as an ingredient may be added to the air exhaust agent 242. The plasticizer may be an adhesion auxiliary for adhering the gel sheet 241 thereto to assist in de-airing. In this manner, a gel sheet is compressed against a surface of either the touch sensor 251c and display 251b, and the exhaust agent 242 is filled into fine grooves of a surface of the other of the touch sensor 251c and display 251b, thereby mitigating or preventing an air layer from being formed between the touch sensor 251c and display 251b.

Hereinafter, as other embodiments of the present invention, other uses of the gel sheet and air exhaust agent will be described. FIGS. 5A through 5D are cross-sectional views illustrating other embodiments of a display module according to the present invention. While the display module is being shown as part of a bar-type terminal, the display module can be used in many other types of terminals including a slide type, a folder type, a swivel type, a swing type, and the like, in which two and more bodies are combined with each other in a relatively movable manner. A keypad or another display may be disposed in the body into which the display module is not incorporated.

Figure 5A:
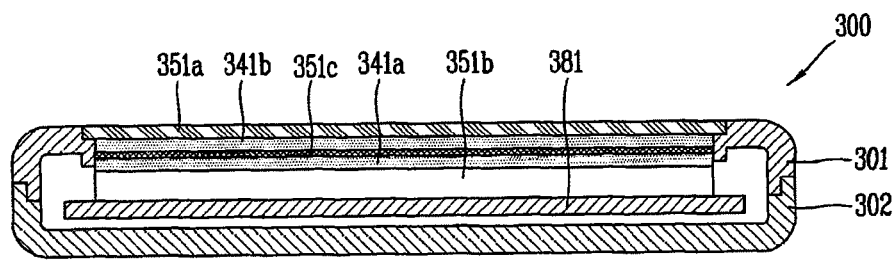
FIGS. 5A through 5D and FIG. 6 are cross-sectional views illustrating other embodiments of a display module according to the present invention

Referring to FIG. 5A, an adhesive sheet 341b is disposed between the touch sensor 351c and window 351a to adhere the touch sensor 351c to the window 351a. The adhesive sheet 341b may be made of the same material as the gel sheet 341a for filling between the touch sensor 351c and the display 351b. In addition, the adhesive sheet 341b may be disposed between the touch sensor 351c and the window 351a in the same or similar method as in the method in which the gel sheet 341a and the air exhaust agent (not shown) are disposed between the touch sensor 351c and display 351b.

Figure 5B:
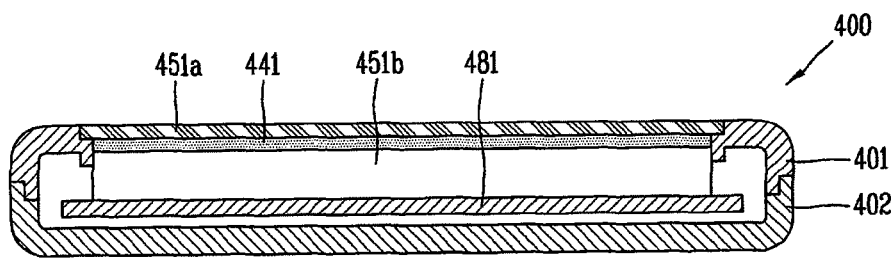

Referring to FIG. 5B, a window 451a is mounted on a front case 401 to cover a display 451b, and a gel sheet 441 is disposed to fill between the window 451a and display 451b. As shown in FIG. 5, the gel sheet 441 is mounted on either one of the window 451a and the display 451b, and an air exhaust agent (not shown) is disposed between the other one of the window 451a and display 451b and the gel sheet 441. In this case, the gel sheet 441 is compressed between the window 451a and display 45b, and the air exhaust agent may be pressed by the other one of the window 451a and display 451b while being coated on the gel sheet 441.

Figure 5C:
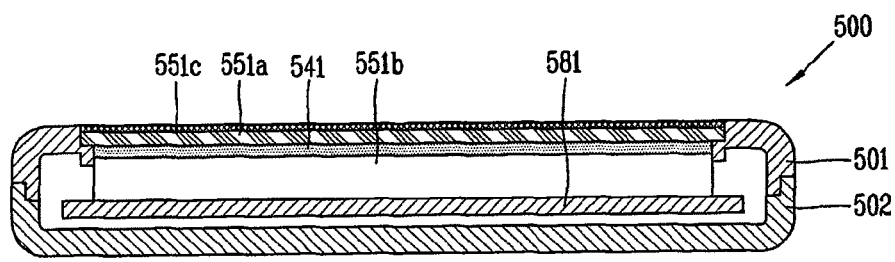

Referring to FIG. 5C, a touch sensor 551c is mounted on a front surface of the window 551a. The touch sensor 551c may be formed to generate a signal corresponding to a touch input by the user's pressure. A gel sheet 541 is disposed between the window 551a and display 551b to remove air. Additionally, in this embodiment, the touch sensor 551c and the window 551a may be adhered to each other by an adhesive sheet having the same material as the gel sheet 541.

Figure 5D:
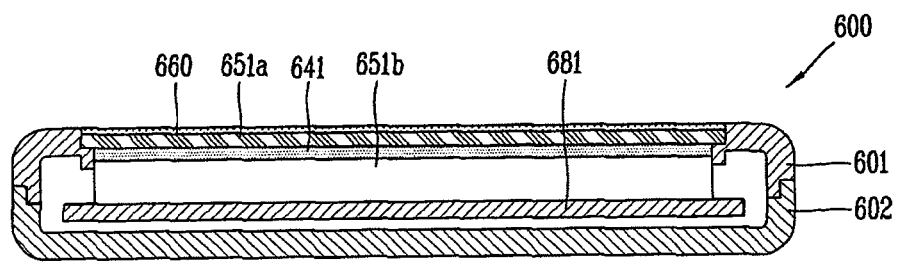

Referring to FIG. 5D, a gel sheet 641 is disposed between a rear surface of the window 651a and the display 651b, and an anti-reflection layer 660 is formed at a front surface of the window 651a. The anti-reflection layer 660 may be formed by anti-reflection coating, thereby improving the visibility of the display 651b.

Figure 6:
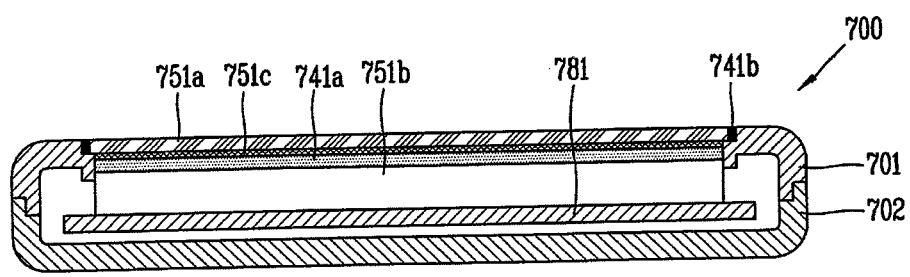

FIG. 6 is a cross-sectional view illustrating another embodiment of the present invention. As shown in FIG. 6, a buffering member 741b may be formed to buffer a window 751a against a terminal case 701. A touch sensor 751c is mounted on a rear surface of the window 751a, and a gel sheet 741a is disposed between the touch sensor 751c and display 751b, and the buffering member 741b made of a same material as the gel sheet 741a is formed to surround an edge of the window 751a along the edge thereof. Through such a structure, the damage due to lateral chipping can be reduced. While the buffering member 741b is shown in a mobile terminal having a touch sensor 751c similar to the exemplary embodiment shown in FIG. 4, it is understood that the buffering member 741b can be provide with the exemplary embodiments shown in FIGS. 5A to 5D.

Figure 7:
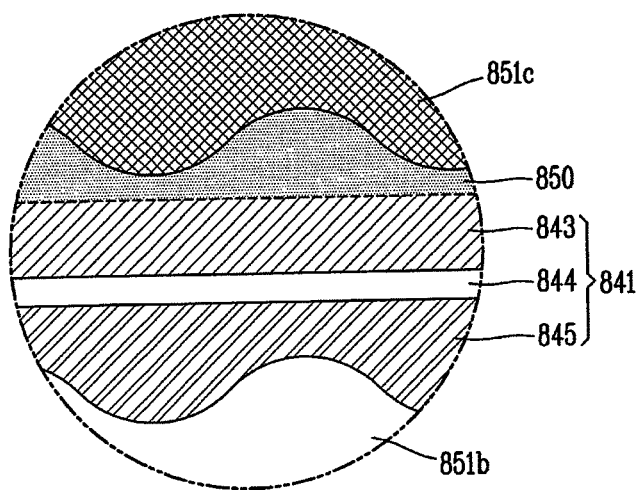
FIG. 7 is a cross-sectional view illustrating a modified example of a gel sheet of FIG. 4.

FIG. 7 is a cross-sectional view illustrating a modified example of a gel sheet shown in FIG. 4. As shown in FIG. 7, a gel sheet 841 disposed between a touch sensor 851c and a display 851b may include a plurality of layers 843, 844, 845 laminated to one another. Among the plurality of layers 843, 844, 845, the outermost layers 843, 845 disposed at opposite surfaces of the gel sheet 841 are made of smaller molecules compared to the size of the molecules of the inner layer 844 disposed between the outermost layers 843, 845. Also, the molecules of the air exhaust agent 842 coated on the gel sheet 841 is made with a molecular structure to be similar to that of the outermost layers 843, 845 compared to that of the inner layer 844. Because of this molecular structure, the integration of the air exhaust agent 842 into the gel sheet 841 can be done more easily, thereby increasing the viscosity of the gel sheet 841.

Figure 8:
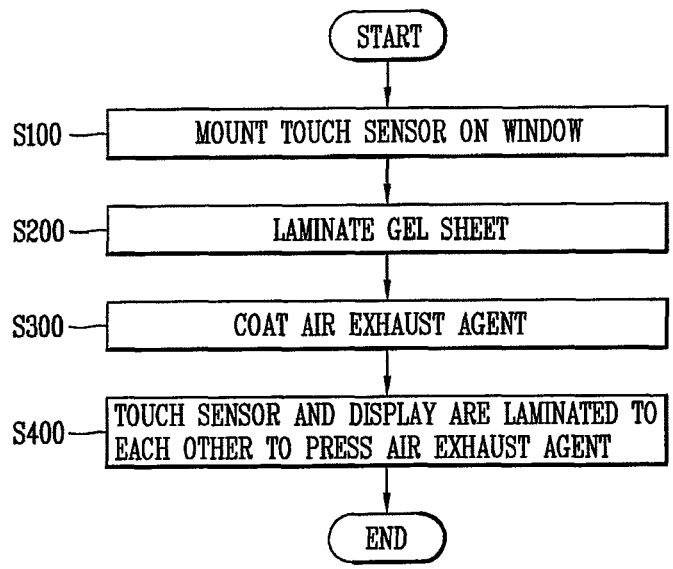
FIG. 8 is a flow chart illustrating a method of manufacturing a display module according to the present invention.
Figure 9:
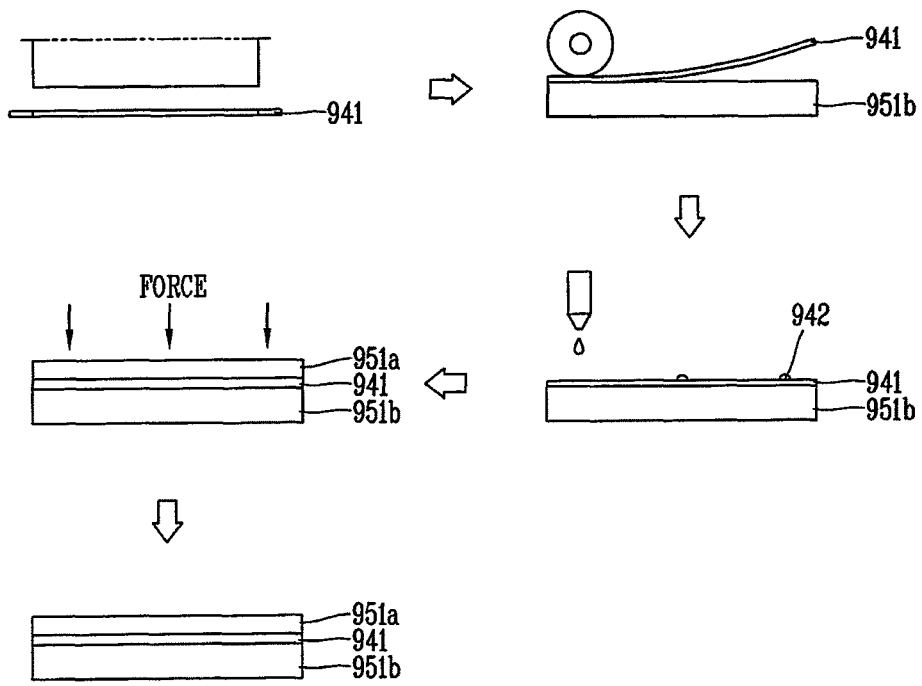
FIG. 9 is a conceptual view illustrating an example of the manufacturing method of FIG. 8.

Having described various mobile terminals and display modules, an exemplary method of manufacturing a display module applicable to the foregoing embodiments will be described. FIG. 8 is a flow chart illustrating a method of manufacturing a display module according to the present invention, and FIG. 9 is a conceptual view illustrating an example of the manufacturing method in FIG. 8.

Referring to FIG. 8, according to a method of manufacturing a display module, first, a gel sheet made of a light-transmittance material is laminated on either one of a touch sensor and a display (S200). For example, as illustrated in FIG. 9, a gel sheet 941 is cut in a size corresponding to the display 951b by punching or the like, and a roller compresses the gel sheet 941 against the display 951b for laminating. The air between the gel sheet 941 and display 951b can be exhausted to the outside by the compression of the roller.

Referring to FIG. 8 again, a touch sensor may be mounted on a surface of the window prior to laminating the gel sheet (S100). In this case, the laminating step (S200) may be a step of compressing a gel sheet against a surface of the touch sensor mounted on the window. Also, the mounting step (S100) may be a step of adhering the touch sensor to the window by an adhesive sheet having a same material as the gel sheet.

Subsequent to laminating the gel sheet to either the touch screen or the display, an air exhaust agent capable of changing from a liquid phase to a gel state over time is coated on the gel sheet or the other one of the touch sensor or the display (S300). For example, as illustrated in FIG. 9, the air exhaust agent 942 may be coated on a surface of the gel sheet 941 with a preset pattern. The preset pattern may be experimentally or numerically determined to planarize a surface of the touch sensor (not shown) or the window 951a by flowing the air exhaust agent 942.

Referring to FIG. 8 again, finally, the touch sensor and display are laminated to each other to press the air exhaust agent (S400). For example, the other one of the touch sensor and the display is disposed on the gel sheet to press the air exhaust agent. Additionally, the air exhaust agent 942 may be further pressed by applying a pressure to the window 951a as illustrated in FIG. 9, and moreover, the gel sheet 941 may also be compressed further.

The method of manufacturing a display module as described above may be implemented by a series of automatic processes. The automated processes may be implemented as illustrated in FIG. 10. FIG. 10 is a conceptual view illustrating another example of a method of manufacturing a display module according to the present invention.

The process in FIG. 10 illustrates a case where a gel sheet is compressed against. As shown in FIG. 10, if is supplied to an automated line, then the gel sheet is compressed against the window or touch sensor mounted with a window by a lamination process using a roller. Then, an auxiliary (air exhaust agent) is coated on a surface of the gel sheet, and a display is adhered thereto. The display presses the air exhaust agent by its own weight to remove air, thereby finishing a display module having a window or touch sensor mounted with the window and a display after a specific period of time.

According to the present invention having the foregoing configuration, a gel sheet is filled into a space between a display and a touch sensor or window, thereby mitigating or preventing an air layer from being formed in a display module. Furthermore, through this, the contrast and brightness of a display module can be improved, thereby enhancing the visibility from the aspect of the user.

In addition, according to the present invention, bubble generation in the display module is suppressed through an air exhaust agent integrated into a gel sheet to planarize a surface. Furthermore, the gel sheet is formed in a gel form, thereby facilitating reworking of the assembly of the display with the window, if necessary. Moreover, buffering against external shock in a terminal can be more reinforced by the material properties of a gel sheet.

Furthermore, according to the present invention, a surface of the gel sheet is laminated, and the other surface is coated with an air exhaust agent, thereby implementing a manufacturing method in a simple manner as well as with an increased air layer removal efficiency.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal comprising:
a main body;
a display located in the main body;
a window located at the main body to cover the display;
a touch sensor located at a surface of the window to detect a touch input;
a gel sheet adhered to one of the touch sensor and the display due to the viscosity of an outermost surface of the gel sheet, the gel sheet being made of a light-transmittance material to fill a space between the touch sensor and the display; and
an air exhaust agent disposed between the gel sheet and the other one of the touch sensor and the display to displace air,
wherein the air exhaust agent changes from a liquid phase to a gel state over time,
wherein the gel sheet has an inner layer and outermost layers disposed at opposite surfaces of the inner layer, the outermost layers are made of smaller molecules than those molecules of the inner layer to increase the viscosity of the gel sheet, and
wherein the air exhaust agent is made of the same material as the outermost layers so as to be integrated into the outermost layers while changing from the liquid phase to the gel state.

2. The mobile terminal of claim 1, wherein the air exhaust agent is coated on the gel sheet to be pressed and covered by said other one of the touch sensor and the display.

3. The mobile terminal of claim 1, wherein the air exhaust agent is coated on the gel sheet or said other one of the touch sensor and the display with a preset pattern.

4. The mobile terminal of claim 1, wherein the air exhaust agent includes a hydrophobic plasticizer having an olefin-based oil.

5. The mobile terminal of claim 1, wherein the gel sheet includes methyl methacrylate.

6. The mobile terminal of claim 1, further comprising an adhesive sheet made of the same material as the gel sheet, the adhesive sheet being disposed between the touch sensor and window to adhere the touch sensor to the window.

7. The mobile terminal of claim 1, wherein the main body includes a terminal case and a buffering member formed between the terminal case and an edge of the window to buffer the window against the terminal case, the buffering member being made of the same material as the gel sheet.

8. A mobile terminal comprising:
a main body;
a display located in the main body;
a window located at the main body to cover the display;
a gel sheet adhered to one of the window and the display due to the viscosity of an outermost surface of the gel sheet to fill a space between the window and the display; and
an air exhaust agent disposed between the gel sheet and the other one of the window and the display to displace air from the space,
wherein the air exhaust agent changes from a liquid phase to a gel state over time,
wherein the gel sheet has an inner layer and outermost layers disposed at opposite surfaces of the inner layer, the outermost layers are made of smaller molecules than those molecules of the inner layer to increase the viscosity of the gel sheet, and
wherein the air exhaust agent is made of the same material as the outermost layers so as to be integrated into the outermost layers while changing from the liquid phase to the gel state.

9. The mobile terminal of claim 8, further comprising a touch sensor located on a surface of the window that is opposite the gel sheet.

* * * * *